Jan. 29, 1929.  1,700,364
M. R. BISHOP ET AL
APPLIANCE FOR DISPENSING SOFT AND PLASTIC MATERIAL
Filed Sept. 28, 1925  2 Sheets-Sheet 1
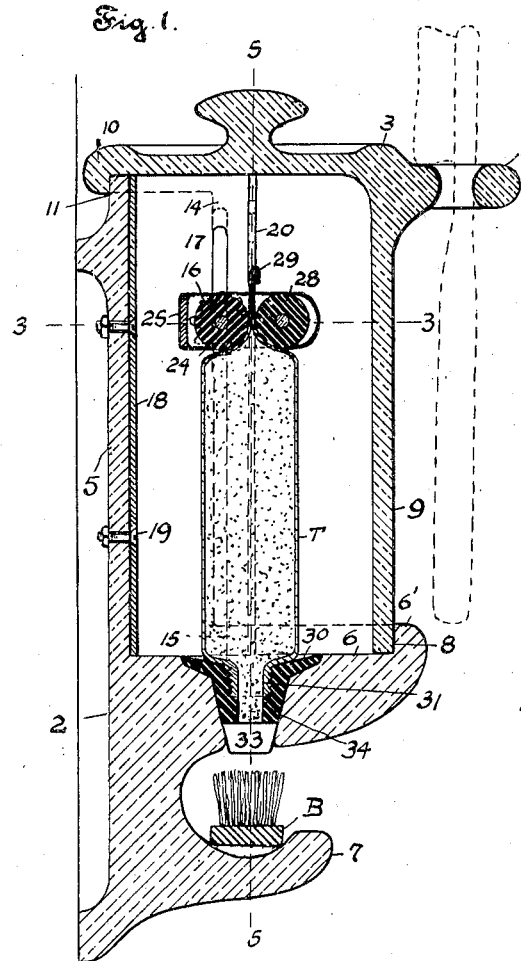
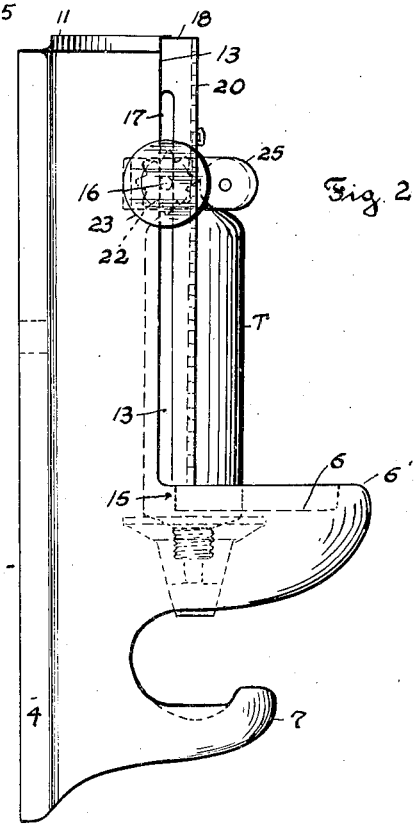
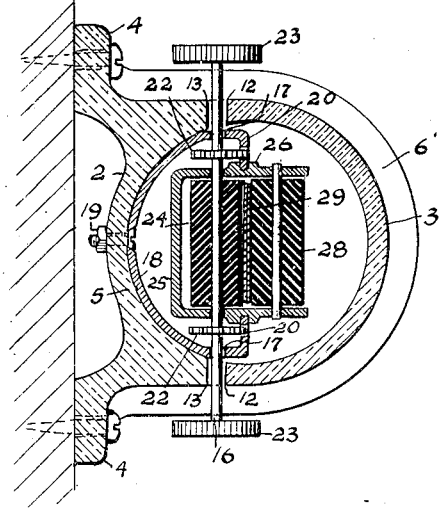
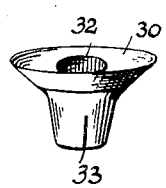
Inventor
M. R. BISHOP.
F. L. BISHOP.
By
Attorney Jan. 29, 1929. 1,700,364

M. R. BISHOP ET AL

APPLIANCE FOR DISPENSING SOFT AND PLASTIC MATERIAL

Filed Sept. 28, 1925   2 Sheets-Sheet 2

Inventor

M. R. BISHOP
F. L. BISHOP

By Fisher, Moser & Moore
Attorney

Patented Jan. 29, 1929.

1,700,364

UNITED STATES PATENT OFFICE.

MABEL R. BISHOP AND FRANKLIN L. BISHOP, OF CLEVELAND, OHIO.

APPLIANCE FOR DISPENSING SOFT AND PLASTIC MATERIAL.

Application filed September 28, 1925. Serial No. 59,066.

Our invention relates to devices and appliances for dispensing soft and plastic materials, for example, tooth paste, shaving creams; and similar compositions. In general, our object is to provide an appliance within which a tube of paste or cream may be seated upon a rubber discharge nipple and whereby the tube may be compressed lengthwise by degrees to dispense its contents in any desired amount at intervals without waste, clogging or objectionable accumulation of material at the mouth of the nipple. The appliance is also particularly constructed to permit the working parts to be removed and replaced quickly and easily, together with a tube of paste, and preferably the main body is made of glass or vitreous material to promote cleanliness. Further, this body is constructed in sections to promote the manufacture thereof, to permit the production of a durable sectional body of fragile material, and to permit the sections to be separated readily and the tube and working parts to be uncovered completely.

Figure 5:
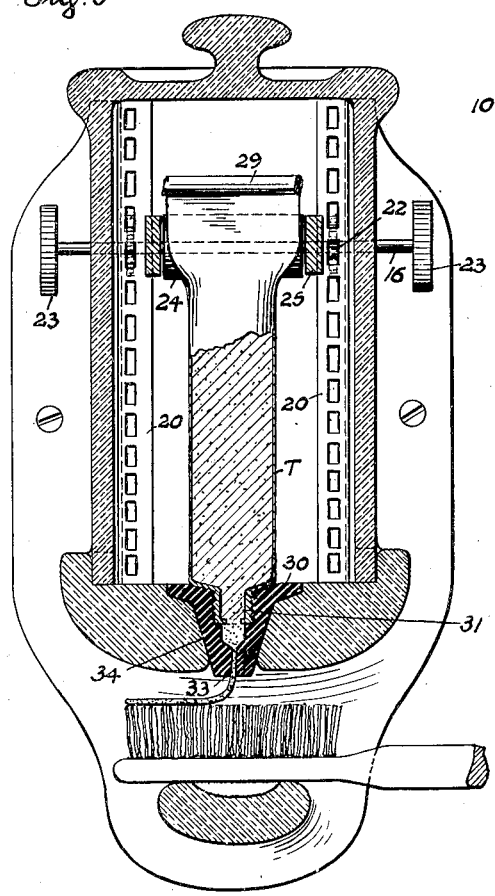
Figure 6:
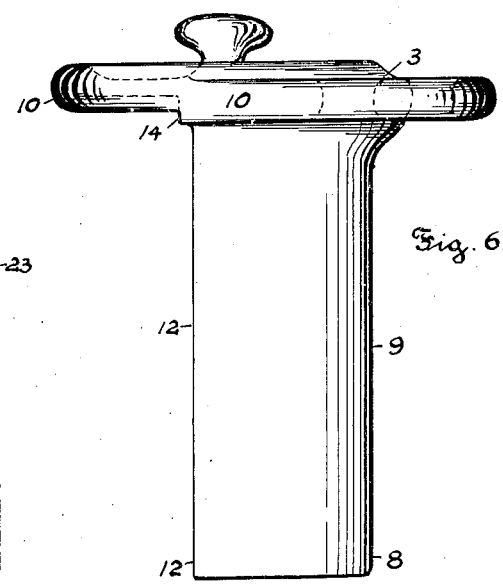
Figure 7:
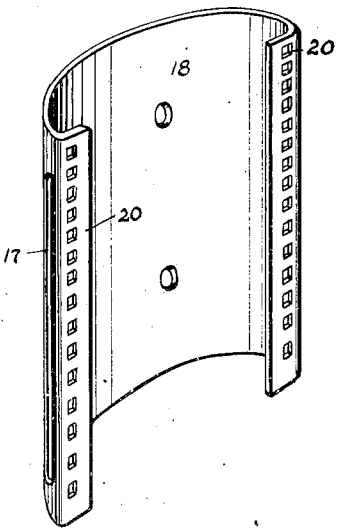
Figure 8:
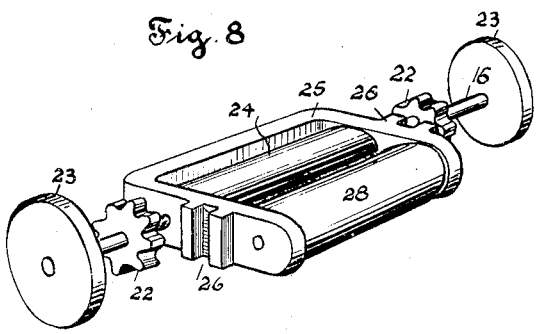

In the accompanying drawings, Fig. 1 is a sectional view vertically through the appliance, including a collapsible tube of paste in dispensing position above a tooth brush at rest therein, and Fig. 2 is a side elevation of the same appliance but with the cover removed. Fig. 3 is a horizontal section and plan view on line 3—3 of Fig. 1. Fig. 4 is a perspective view of the rubber seat and discharge nipple for the tube. Fig. 5 is a vertical section and front view of the complete device on line 5—5 of Fig. 1. Fig. 6 is a side elevation of the cover alone. Fig. 7 is a perspective view of the metal rack, and Fig. 8 is a perspective view of the roller and gear device for squeezing the tube and feeding the paste.

The invention comprises a main receptacle made in two pieces or sections, a base member 2 and a cover section 3, each molded of glass or vitreous material, preferably but not necessarily. Base member 2 is formed with flanges 4 to facilitate attachment of the device to a wall or other support, and the upper front part of this base member may be formed with an open recess 5 extending upwardly from a flat shelf 6 which overhangs an integral arm or rest 7 for a tooth brush B. Shelf 6 is bordered by a raised flange or rib 6' adapted to encircle the bottom edge 8 of the depending semi-circular wall 9 of cover 3, and this cover is also formed with a flanged top part 10 adapted to hook over the circular upper edge 11 of member 2. The entire top and front half of the receptacle may therefore be removed and replaced very readily but nevertheless firmly locked when in place. Furthermore the vertical rear edges 12 of semi-circular wall 9 of this removable cover are spaced apart slightly from the vertical front edges 13 of base member 2 when the cover is locked in place, the cover having a stop shoulder 14 at each side beneath top part 10 to engage front edges 13, and the base member having a corresponding stop shoulder 15 at each side of the recess in shelf 6 adapted to be engaged by edge 12 of wall 9, thereby providing open slots at opposite sides of the receptacle when the cover is in place wherein a cross shaft 16 may travel in a vertical plane. This shaft also extends through vertical slots 17—17 in a partly circular metal plate 18 which is secured by bolts or screws 19 within the front recess 5 of base member 2 and which is flanged inwardly and perforated in its flanged portion to provide a gear rack 20 at each side of the recess for a set of operating gear wheels 22 on cross shaft 16. Thumb pieces 23 on the outer ends of the shaft enable the operator to rotate the shaft and therethrough a rubber roller 24 confined within a frame 25 having ribs or channels 26 in guiding engagement with the edge portions of the inturned flanges 20. An idle rubber roller 28 is mounted in frame 25 in front of operating roller 24, and these rollers are adapted to press the sides of a collapsible tube T together when the flattened end 29 of the tube is inserted between them and the thumb pieces 23 turned clockwise. In so doing the gear wheels 22 travel downwardly on rack 20 and press the head of the tube down upon a yielding seat comprising a rubber nipple 30 which is detachably connected with the screw-threaded neck 31 of the tube. The discharge opening 32 in the center of rubber nipple 30 is slightly smaller in diameter than the neck 31 so that the nipple must be expanded at its upper end in sleeving it over the neck, and the lower end or tip of the nipple is merely slitted transversely to provide a flat thin outlet passage 33 which communicates with the central discharge opening 32. The spreading of the upper end of the nipple tends to press the severed sides of the tip together, thereby closing and sealing the discharge opening of the tube automatically when the squeezing pressure on the tube is discontinued. This self-closing sealing effect is enhanced by using a round tapering nipple within a tapering seat or opening 34 within shelf 6. Thus in pressing the rubber nipple into tapered opening 34 the rubber is compressed and the slit or passage 33 is closed more or less tightly. Furthermore when the squeezing rollers are operated to collapse the tube, the head of the tube is pressed downwardly upon the nipple which compresses the slitted tip laterally. However this lateral pressure is counteracted in squeezing the tube and the paste is expressed in the form of a thin flat strip from the slit. When the squeezing pressure is relieved the compressed rubber at the mouth of the nipple will expand and close the slit. This self-closing of the outlet member prevents leakage and waste and also exposure of the paste to the drying and hardening influence of air. The squeezing rollers may be operated by one hand and the tooth brush with the other hand, and the rest arm for the tooth brush may be recessed at its top to guide the brush and to catch any liquid escaping from the brush. If desired, cover member 3 may also be formed with a perforated rim 35 to hold one or more brushes, and the body and cover members may be variously shaped without departing from the actual invention described herein and as set forth in the following claims.

What we claim is:

1. A dispensing device, comprising a supporting member having a tapered opening, a tapered rubber discharge nipple seated within said opening, and means for squeezing a collapsible tube, said means being arranged to press the tube against said nipple.

2. A dispensing device, comprising a supporting member having a tapered and countersunk opening, a conical rubber discharge nipple seated within said opening having a flange fitting in said countersunk part of said opening, and means for squeezing a collapsible tube with pressing engagement against said nipple.

3. A dispensing device, comprising a porcelain base member having a shelf containing an opening, a compressible seat and closure member seated within said opening of said base member, a porcelain cover section removably seated upon said shelf, a rigid metal plate affixed to said base member, and a tube squeezing device movably supported upon and guided by said plate having operating means extending outwardly between the sides of said base member and cover section.

4. A dispensing device, comprising a porcelain receptacle made in sections separably united and spaced apart at each side, a rigid metal plate secured to one section having guiding portions paralleling the spaces between said sections, and means for supporting a collapsible tube in discharge connection with one of said sections, said means comprising squeezing devices for the tube having operating members engaged with said guiding portions and extending outwardly between said sections.

5. A dispensing device, comprising a base member having a shelf bordered by a raised flange and a recessed wall extending upwardly from said shelf, and a cover member formed with a skirting adapted to engage said flange and having a recessed border portion adapted to hook over said wall to secure said base member and cover member separably together, said members being spaced slightly apart at their vertical joint lines to provide slots between them when assembled.

6. A dispensing device, comprising a base member, a cover member detachably connected therewith, said members having semicircular walls spaced apart at their edges to provide vertically extending slots, a metal plate rigidly connected to said base member having gear racks and slots on opposite sides and said slots communicating with said first named slots, a squeezing device having gears engaging said gear racks of said metal plate, and operating means for said device protruding from said slots.

7. A dispensing device, comprising a base member having a flat shelf formed with a conical opening therein and bordered by a raised flange and formed with a rear wall extending upwardly, a cover member having a front skirting and a flanged top adapted to hook over said rear wall with said flange, spacing means integral with said base member and cover member adapted to space said wall and skirting apart at opposite sides, a double gear rack connected to said rear wall having slots corresponding to said side slots, tube squeezing means having operating gears and guiding means engaging said double gear rack, operating means for said squeezing means extending through said slots, and a compressible seat member for a collapsible tube seated in said opening of said base member.

In testimony whereof we affix our signatures.

MABEL R. BISHOP.
FRANKLIN L. BISHOP.